(12) United States Patent
Li

(10) Patent No.: US 10,412,298 B2
(45) Date of Patent: Sep. 10, 2019

(54) CONTROL METHOD, CONTROL DEVICE AND ELECTRONIC DEVICE

(71) Applicant: GUANGDONG OPPO MOBILE TELECOMMUNICATIONS CORP., LTD., Dongguan (CN)

(72) Inventor: Longjia Li, Dongguan (CN)

(73) Assignee: GUANGDONG OPPO MOBILE TELECOMMUNICATIONS CORP, LTD., Dongguan, Guangdong (CN)

( * ) Notice: Subject to any disclaimer, the term of this patent is extended or adjusted under 35 U.S.C. 154(b) by 23 days.

(21) Appl. No.: 15/622,431

(22) Filed: Jun. 14, 2017

(65) Prior Publication Data

US 2018/0152624 A1 May 31, 2018

(30) Foreign Application Priority Data

Nov. 29, 2016 (CN) .......................... 2016 1 1079316

(51) Int. Cl.
*G02B 13/02* (2006.01)
*H04N 5/232* (2006.01)
(Continued)

(52) U.S. Cl.
CPC .......... *H04N 5/23216* (2013.01); *G06T 5/50* (2013.01); *H04N 5/2258* (2013.01);
(Continued)

(58) Field of Classification Search
CPC ............. H04N 5/23296; H04N 5/2258; H04N 5/23216; H04N 5/23229; H04N 5/23238; H04N 5/23241; H04N 5/23245
See application file for complete search history.

(56) References Cited

U.S. PATENT DOCUMENTS 6,018,425 A * 1/2000 Nakabayashi ........... G02B 9/10
359/716
9,204,041 B1 * 12/2015 Campbell ............ H04N 13/239
(Continued)

FOREIGN PATENT DOCUMENTS

CN 1441614 A 9/2003
CN 101461702 A 6/2009
(Continued)

OTHER PUBLICATIONS

EPO, Office Action for EP Application No. 17175803, dated Jan. 17, 2018.
(Continued)

*Primary Examiner* — Alison Slater
(74) *Attorney, Agent, or Firm* — Hodgson Russ LLP

(57) ABSTRACT

The present disclosure provides a control method, a control device and an electronic device. The wide-angle camera is started first. Then, the displayer is controlled to display a cached wide-angle image as a preview image. Next, a designated area is identified and the telephoto camera is started during zooming the preview image. Further, the actuator is controlled such that a cached telephoto image is located in the designated area, and the wide-angle camera and telephoto camera are controlled to image respectively. Finally, the wide-angle image and telephoto image are combined. With the control method and device and the electronic device in the present disclosure, the telephoto camera may image the designated area when the user zooms the designated area of the cached wide-angle image, thereby enhancing sharpness of the designated area and improving the user experience.

19 Claims, 11 Drawing Sheets cached wide-angle image-preview image cached telephoto image

(51) Int. Cl.
*G06T 5/50* (2006.01)
*H04N 5/225* (2006.01)
*H04N 5/235* (2006.01)
*H04N 5/262* (2006.01)
*H04N 5/265* (2006.01)

(52) U.S. Cl.
CPC ......... *H04N 5/2353* (2013.01); *H04N 5/2355* (2013.01); *H04N 5/23238* (2013.01); *H04N 5/23245* (2013.01); *H04N 5/23296* (2013.01); *H04N 5/265* (2013.01); *H04N 5/2628* (2013.01); *G06T 2207/20212* (2013.01); *H04N 5/23293* (2013.01)

(56) References Cited

U.S. PATENT DOCUMENTS

| | | | |
|---|---|---|---|
| 2003/0025791 | A1 | 2/2003 | Kaylor |
| 2005/0036776 | A1* | 2/2005 | Yasuda ............... G02B 13/0035 396/72 |
| 2006/0175549 | A1 | 8/2006 | Miller et al. |
| 2010/0238327 | A1 | 9/2010 | Griffith et al. |
| 2012/0075489 | A1 | 3/2012 | Nishihara |
| 2012/0327234 | A1* | 12/2012 | Fish, Jr. ................. B60R 11/04 348/148 |
| 2014/0132735 | A1* | 5/2014 | Lee ..................... H04N 5/2258 348/47 |
| 2016/0028949 | A1* | 1/2016 | Lee ......................... H04N 5/06 348/218.1 |
| 2016/0050351 | A1 | 2/2016 | Lee et al. |
| 2016/0241793 | A1* | 8/2016 | Ravirala ............... H04N 5/247 |
| 2016/0381289 | A1* | 12/2016 | Kim ................... H04N 5/23222 348/38 |
| 2018/0048825 | A1* | 2/2018 | Wang ................... H04N 5/2258 |

FOREIGN PATENT DOCUMENTS

| | | |
|---|---|---|
| CN | 101753825 A | 6/2010 |
| CN | 102138157 A | 7/2011 |
| CN | 202565371 A | 11/2012 |
| CN | 202565371 U | 11/2012 |
| CN | 203435072 A | 2/2014 |
| CN | 203435072 U | 2/2014 |
| CN | 103986867 A | 8/2014 |
| CN | 104333703 | 2/2015 |
| CN | 104333708 A | 2/2015 |
| CN | 104867155 A | 8/2015 |
| CN | 105308947 A | 2/2016 |
| CN | 105472263 A | 4/2016 |
| CN | 105491267 A | 4/2016 |
| CN | 105959553 A | 9/2016 |
| CN | 105991930 A | 10/2016 |
| CN | 106131397 | 11/2016 |
| CN | 106454121 | 2/2017 |
| CN | 106506941 | 3/2017 |
| CN | 106791376 | 5/2017 |
| CN | 106791377 | 5/2017 |
| JP | 2007164258 | 6/2007 |
| WO | 2016013902 | 1/2016 |
| WO | 2016130325 | 8/2016 |

OTHER PUBLICATIONS

WIPO, English Translation of ISR/WO, PCT Appl. No. CN2017087957, Sep. 1, 2017.
EPO, Office Action for EP Application No. 17175803, dated Aug. 22, 2018.
SIPO, OA for CN application 201611079316.X (Dec. 5, 2018).
Liu et al., "High dynamic range image acquisition based on detail features," Journal of Xi'an University of Posts and Telecommunications, Nov. 2014, vol. 19, No. 6, pp. 17-21.
SIPO, Second Office Action for CN Application No. 201611079316, dated Apr. 1, 2019.

* cited by examiner cached wide-angle
image-preview image cached telephoto image initial position
zoomed preview image designated area
zoomed preview image
with designated area overlapped wide-angle
image and telephoto image

CONTROL METHOD, CONTROL DEVICE AND ELECTRONIC DEVICE

CROSS-REFERENCE TO RELATED APPLICATIONS

This application is based on and claims priority to Chinese Patent Application Serial No. 201611079316.X, filed on Nov. 29, 2016, the entire contents of which are incorporated herein by reference.

FIELD

The present disclosure relates to the imaging technology field, and more particularly, to a control method, a control device and an electronic device.

BACKGROUND

A dual-camera generally includes a wide-angle camera and a telephoto camera. A field of view of the telephoto camera is located within a field of view of the wide-angle camera. Therefore, an image output by the telephoto image may be combined with a corresponding portion of a wide-angle image output by the wide-angle camera to enhance sharpness of the corresponding portion. However, in the related art, this image combining is not intelligent enough, and the user experience is poor.

SUMMARY

The control method is applied for controlling an electronic device. The electronic device includes an imaging device, a displayer and an input device. The imaging device includes a wide-angle camera, a telephoto camera and an actuator. A field of view of the wide-angle camera has an overlapped portion with a field of view of the telephoto camera. The actuator is configured to actuate relative movement of the wide-angle camera and/or the telephoto camera for changing a relative location of the overlapped portion in the field of view of the wide-angle camera. The control method includes: starting the wide-angle camera and closing the telephoto camera; controlling the displayer to display a cached wide-angle image output by the wide-angle camera as a preview image; processing a user input of the input device to determine whether to zoom the preview image; identifying a designated area and starting the telephoto camera during zooming the preview image; controlling the actuator such that a cached telephoto image output by the telephoto camera is located in the designated area; controlling the wide-angle camera to capture a wide-angle image and controlling the telephoto camera to capture a telephoto image, according to a user input; and combining the wide-angle image and the telephoto image to enhance sharpness of an overlapped portion between the wide-angle image and the telephoto image.

The control device is applied for controlling an electronic device. The electronic device includes an imaging device, a displayer and an input device. The imaging device includes a wide-angle camera, a telephoto camera and an actuator. A field of view of the wide-angle camera has an overlapped portion with a field of view of the telephoto camera. The actuator is configured to actuate relative movement of the wide-angle camera and/or the telephoto camera for changing a relative location of the overlapped portion in the field of view of the wide-angle camera. The control device includes a non-transitory computer-readable medium comprising computer-executable instructions stored thereon; and an instruction execution system, which is configured by the instructions to implement at least one of a first control module, a second control module, a processing module, a third control module, a fourth control module, a fifth control module and a combining module. The first control module is configured to start the wide-angle camera and to close the telephoto camera. The second control module is configured to control the displayer to display a cached wide-angle image output by the wide-angle camera as a preview image. The processing module is configured to process a user input of the input device to determine whether to zoom the preview image. The third control module is configured to identify a designated area and start the telephoto camera during zooming the preview image. The fourth control module is configured to control the actuator such that a cached telephoto image output by the telephoto camera is located in the designated area. The fifth control module is configured to control the wide-angle camera to capture a wide-angle image and control the telephoto camera to capture a telephoto image, according to a user input. The combining module is configured to combine the wide-angle image and the telephoto image to enhance sharpness of an overlapped portion between the wide-angle image and the telephoto image.

The electronic device includes an imaging device, a displayer, an input device and the control device. The control device includes a non-transitory computer-readable medium comprising computer-executable instructions stored thereon; and an instruction execution system, which is configured by the instructions to implement at least one of a first control module, a second control module, a processing module, a third control module, a fourth control module, a fifth control module and a combining module. The first control module is configured to start the wide-angle camera and to close the telephoto camera. The second control module is configured to control the displayer to display a cached wide-angle image output by the wide-angle camera as a preview image. The processing module is configured to process a user input of the input device to determine whether to zoom the preview image. The third control module is configured to identify a designated area and start the telephoto camera during zooming the preview image. The fourth control module is configured to control the actuator such that a cached telephoto image output by the telephoto camera is located in the designated area. The fifth control module is configured to control the wide-angle camera to capture a wide-angle image and control the telephoto camera to capture a telephoto image, according to a user input. The combining module is configured to combine the wide-angle image and the telephoto image to enhance sharpness of an overlapped portion between the wide-angle image and the telephoto image.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
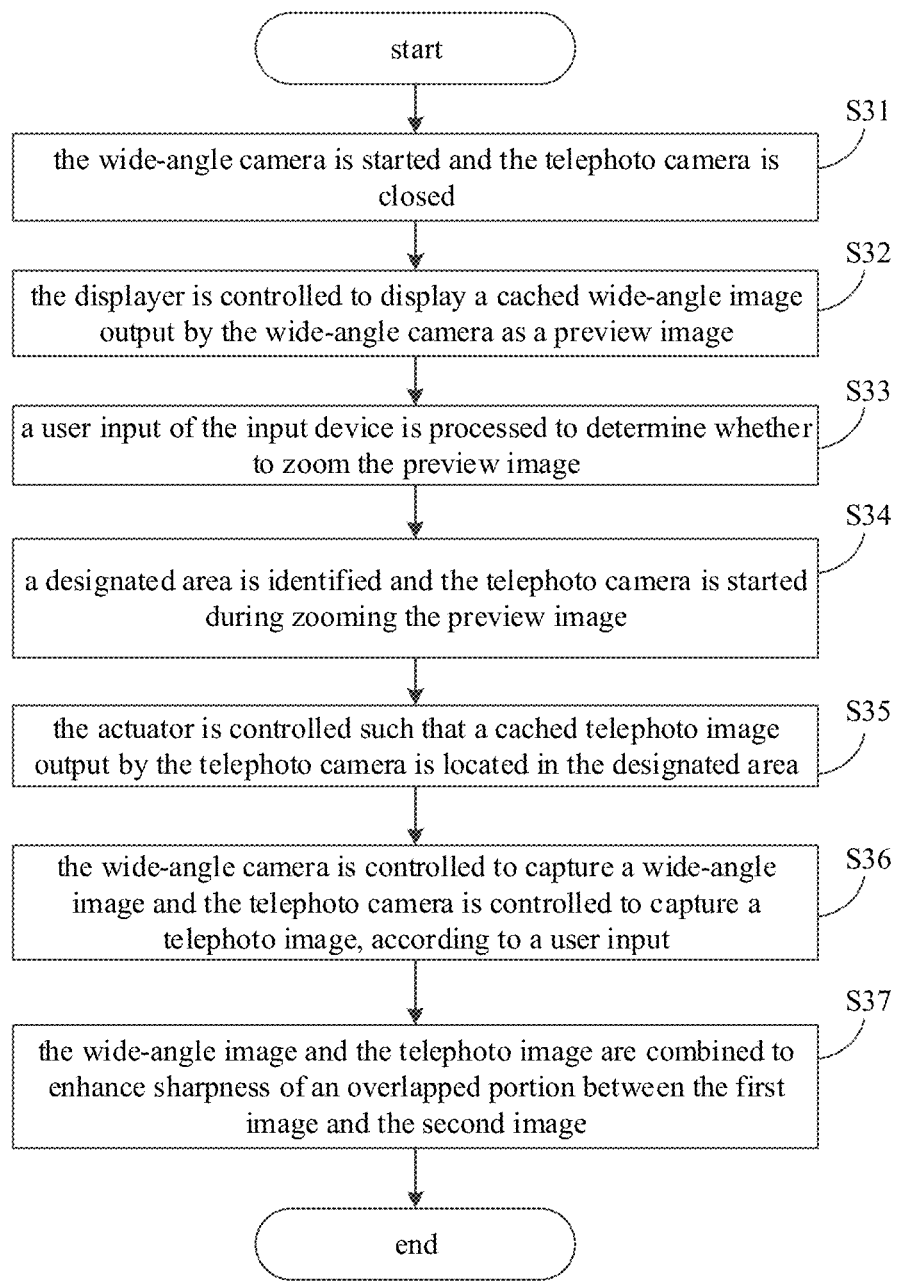
FIG. 1 is a flow chart of a control method in at least one embodiment of the present disclosure.

ELEMENT LIST electronic device 100, imaging device 10, wide-angle camera 12, overlapped portion 13, telephoto camera 14, actuator 16, touch screen 20, displayer 22, input device 24, control device 30, first control module 31, second control module 32, processing module 33, third control module 34, processing unit 342, extending unit 344, starting unit 346, fourth control module 35, fifth control module 36, determining unit 362, first control unit 364, combining module 37, determining module 38, sixth control module 39, cropping unit 392, stretching unit 394, second control unit 396.

DETAILED DESCRIPTION

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Figure 2:
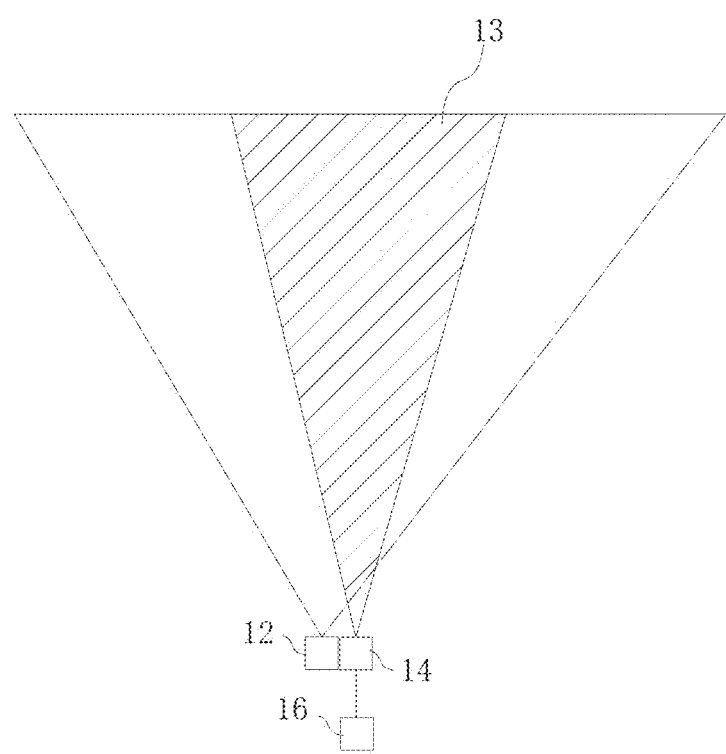
FIG. 2 is a schematic diagram illustrating an imaging device in at least one embodiment of the present disclosure.
Figure 3:
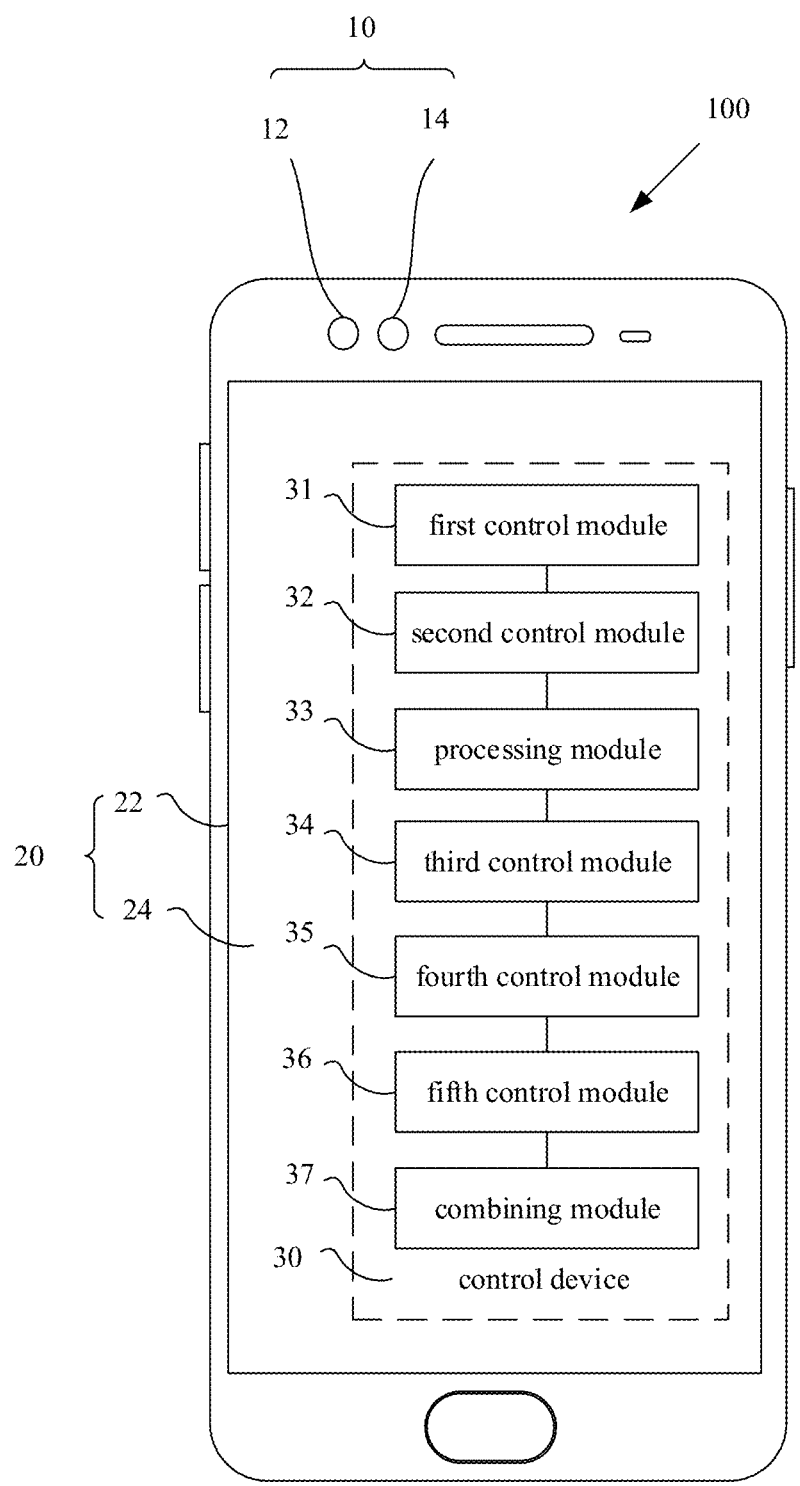
FIG. 3 is a schematic diagram illustrating functional modules of an electronic device in at least one embodiment of the present disclosure.

FIG. 1 illustrates a control method in at least one embodiment of the present disclosure. FIG. 2 illustrates an imaging device in at least one embodiment of the present disclosure. FIG. 3 illustrates functional modules of an electronic device in at least one embodiment of the present disclosure. As shown in FIGS. 1, 2 and 3, a control method provided in embodiments of the present disclosure may be applied for controlling an electronic device 100. The electronic device 100 includes an imaging device 10, a displayer 22 and an input device 24. The imaging device 10 includes a wide-angle camera 12, a telephoto camera 14 and an actuator 16. A field of view of the wide-angle camera 12 and a field of view of the telephoto camera 14 have an overlapped portion 13. The actuator 16 is configured to actuate relative movement of the wide-angle camera 12 and/or the telephoto camera 14 for changing a relative location of the overlapped portion 13 in the field of view of the wide-angle camera 12. The control method includes following acts.

At block S31, the wide-angle camera is started and the telephoto camera is closed.

At block S32, the displayer is controlled to display a cached wide-angle image output by the wide-angle camera as a preview image.

At block S33, a user input of the input device is processed to determine whether to zoom the preview image.

At block S34, a designated area is identified and the telephoto camera is started during zooming the preview image.

At block S35, the actuator is controlled such that a cached telephoto image output by the telephoto camera is located in the designated area.

At block S36, the wide-angle camera is controlled to capture a wide-angle image and the telephoto camera is controlled to capture a telephoto image, according to a user input.

At block S37, the wide-angle image and the telephoto image are combined to enhance sharpness of an overlapped portion between the first image and the second image.

The control device 30 provided in embodiments of the present disclosure may be applied for controlling an electronic device 100.

The control device 30 includes a non-transitory computer-readable medium (not shown) including computer-executable instructions stored thereon; and an instruction execution system (not shown), which is configured by the instructions to implement at least one of a first control module 31, a second control module 32, a processing module 33, a third control module 34, a fourth control module 35, a fifth control module 36, and a combining module 37. The first control module 31 is configured to start the wide-angle camera 12 and to close the telephoto camera 14.

The second control module 32 is configured to control the displayer 22 to display a cached wide-angle image output by the wide-angle camera 12 as a preview image. The processing module 33 is configured to process a user input of the input device 24 to determine whether to zoom the preview image. The third control module 34 is configured to identify a designated area and to start the telephoto camera 14 during zooming the preview image. The fourth control module 35 is configured to control the actuator 16 such that a cached telephoto image output by the telephoto camera 14 is located in the designated area. The fifth control module 36 is configured to control the wide-angle camera 12 to capture a wide-angle image and control the telephoto camera 14 to capture a telephoto image, according to a user input. The combining module 37 is configured to combine the wide-angle image and the telephoto image to enhance sharpness of the overlapped portion 13 between the wide-angle image and the telephoto image.

That is, the control method provided in embodiments of the present disclosure may be realized by the control device 30 provided in embodiments of the present disclosure. Block S31 may be realized by the first control module 31, block S32 may be realized by the second control module 32, block S33 may be realized by the processing module 33, block S34 may be realized by the third control module 34, block S35 may be realized by the fourth control module 35, block S36 may be realized by the fifth control module 36, and block S37 may be realized by the combining module 37.

In at least one embodiment, the control device 30 provided in the embodiments of the present disclosure may be applied for the electronic device 100 provided in the embodiments of the present disclosure, or the electronic device 100 provided in the embodiments of the present disclosure may include the control device 30 provided in the embodiments of the present disclosure.

The control method, the control device 30 and the electronic device 100 according to embodiments of the present disclosure may use the actuator 16 to control the relative movement of the wide-angle camera 12 and the telephoto camera 14 when the user performs the zooming, and change the relative location of the overlapped portion 13 in the field of view of the wide-angle camera 12, and then combine the overlapped image portions to improve sharpness of the image portion, so that the telephoto camera 14 may image the designated area when the user zooms the designated area of the cached wide-angle image, thereby enhancing sharpness of the designated area and improving the user experience.

In at least one embodiment, the electronic device 100 includes a mobile phone or a tablet computer, which will not be limited herein. In at least one embodiment of the present disclosure, the electronic device 100 is the mobile phone.

In at least one embodiment, the imaging device 10 includes front dual cameras or rear dual cameras, which will not be limited herein.

In at least one embodiment, the displayer 22 and the input device 24 are integrated as a touch screen 20. That is, the touch screen 20 may include the displayer 22 and the input device 24.

In at least one embodiment, the angle of view of the wide-angle camera 12 is from 70 degree to 90 degree. The angle of view of the telephoto camera 14 is from 20 degree to 60 degree.

In at least one embodiment, the wide-angle camera 12 refers to a camera with a wide-angle lens, which generally has a shorter focal length and a larger angle of view. The angle of view of the wide-angle camera 12 in at least one embodiment of the present disclosure may be about 80 degree. The wide-angle camera 12 is generally configured to capture close-range scenes.

In at least one embodiment, the telephoto camera 14 refers to a camera with a telephoto lens, which generally has a longer focal length and a smaller angle of view. The angle of view of the telephoto camera 14 in at least one embodiment of the present disclosure may be about 20 degree. The telephoto camera 14 is generally configured to capture long-range scenes.

In at least one embodiment, the wide-angle camera 12 and the telephoto camera 14 may be arranged closely side-by-side, such that the field of view of the telephoto camera 14 is located within the field of view of the wide-angle camera 12. That is, the whole telephoto image is located within the range of the wide-angle image.

In this way, the telephoto image of the telephoto camera 14 has a maximum proportion in the wide-angle image of the wide-angle camera 12, such that image quality of the maximum area in the first image may be improved.

In at least one embodiment, the field of view of the wide-angle camera 12 and the field of view of the telephoto camera 14 are overlapped partially. That is, the wide-angle image and the telephoto image are overlapped partially, so that sharpness of the corresponding portion may be enhanced by combining the overlapped image portions.

Thus, the imaging device 10 may be applied in some special scenes, such as a scene in which it is required to enhance marginal sharpness of the wide-angle image to acquire a corresponding image with special effects.

In at least one embodiment, the actuator 16 includes a microelectromechanical motor or a mechanical motor.

In at least one embodiment, the wide-angle camera 12 is fixed, and the actuator 16 controls the telephoto camera 14 to rotate relative to the wide-angle camera 12. In this way, the telephoto camera 14 may be rotated by the actuator 16, such that the telephoto camera 14 may be controlled to image in alignment with the user-designated area when the user performs the zooming.

In at least one embodiment, the wide-angle camera 12 and the telephoto camera 14 may be at the same shooting angle after rotation, so that quality of the image obtained after combining the wide-angle image and the telephoto image may be improved, and problems such as ghosting may be avoided.

In at least one embodiment, the control device 30 closes the telephoto camera 14 when starting the wide-angle camera 12.

In at least one embodiment, when the wide-angle camera 12 is working, the telephoto camera 14 may enter a dormant state or stop working, thus avoiding unnecessary power consumption and reducing a working space required when the imaging device 10 is working.

Figure 4:
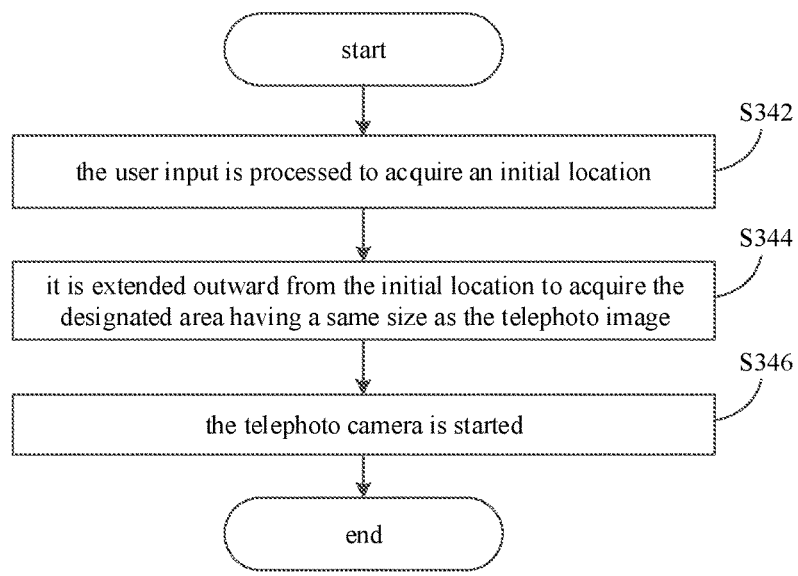
FIG. 4 is a flow chart of a control method in at least one embodiment of the present disclosure.
Figure 5A:
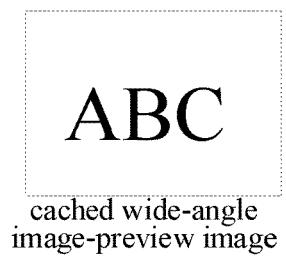
FIGS. 5(a)-5(e) are schematic diagrams illustrating images related to a control method in at least one embodiment of the present disclosure.
Figure 5B:
Figure 5C:
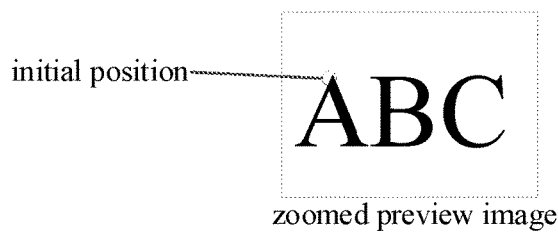
Figure 5D:
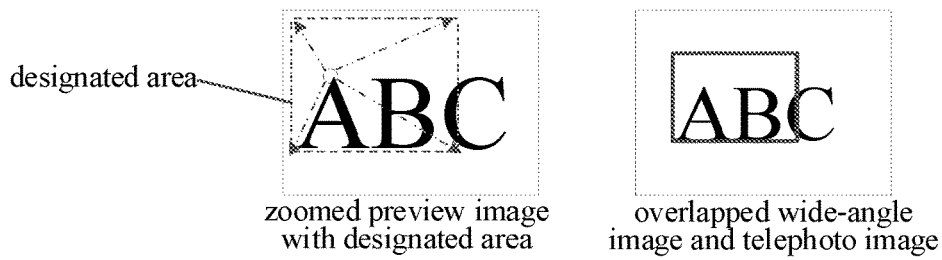
Figure 5E:
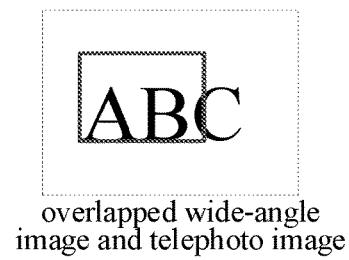

FIG. 4 illustrates a control method in at least one embodiment of the present disclosure. As shown in FIG. 4, block S34 includes following acts.

At block S342, the user input is processed to acquire an initial location.

At block S344, it is extended outward from the initial location to acquire the designated area having a same size as the telephoto image.

At block S346, the telephoto camera is started.

As illustrated in FIGS. 5(*a*) and 5(*b*), the cached wide-angle image is displayed as the preview image, and the cached telephoto image (b) is generated by the telephoto camera. When the preview image is zoomed, the initial location is identified according to the user input, as illustrated in FIG. 5(*c*). For example, the initial location may be a point having coordinates on the preview image. An extension is performed from the initial location, in which a rectangular defined by the dashed line has a same size with the cached telephoto image, as illustrated in FIG. 5(*d*). The rectangular defined by solid line is an intermediate example for acquiring the designated area.

That is to say, from the initial position, the designated area is acquired by extending outward from the initial location on the preview image such that the designated area surrounds the initial position and has a same size with a cached telephoto image output by the telephoto camera. That is to say, a portion of the preview image is selected from the initial position to acquire the designated area such that the designated area has a same size with the cached telephoto image.

In addition, FIG. 5(*e*) illustrates overlapped wide-angle image and telephoto image generated by combining the wide-angle and the telephoto image of an overlapped portion.

Figure 6:
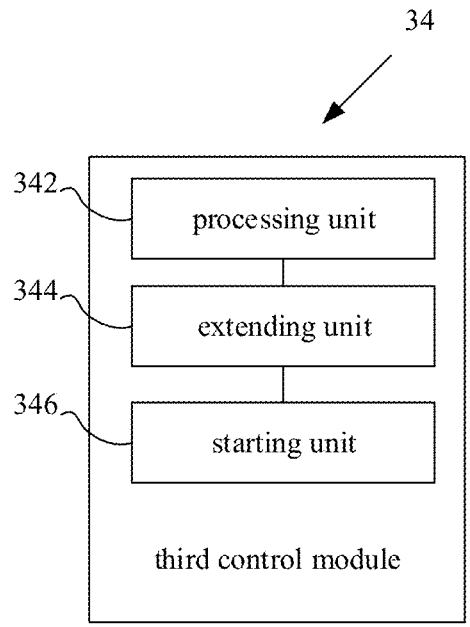
FIG. 6 is a schematic diagram illustrating functional modules of a third control module in at least one embodiment of the present disclosure.

FIG. 6 illustrates functional modules of an electronic device in at least one embodiment of the present disclosure. As shown in FIG. 6, the third control module 34 includes a processing unit 342, an extending unit 344 and a starting unit 346. The processing unit 342 is configured to process the user input to acquire an initial location. The extending unit 344 is configured to extend outward from the initial location to acquire the designated area having a same size as the telephoto image. The starting unit 346 is configured to start the telephoto camera 14.

That is, block S342 may be realized by the processing unit 342, block S344 may be realized by the extending unit 344, and block S346 may be realized by the starting unit 346.

In at least one embodiment, the control device 30 controls the displayer 22 to display the cached wide-angle image, and then acquire the initial location in the cached wide-angle image based on the user input. The control device 30 extends outward based on the initial location to acquire the designated area having the same size as the telephoto image, that is, the area to be imaged by the telephoto camera 14 is acquired. The wide-angle camera 12 and the telephoto camera 14 capture images simultaneously, and the images in the designated area are combined, thereby enhancing sharpness of the image in the designated area.

In at least one embodiment, when the user performs the zooming, the control device 30 may start the telephoto camera 14. Since a focus area of the telephoto camera 14 may be not the user-designated area (that is, the overlapped portion 13 of the wide-angle image and the telephoto image may be different from the user-designated area), the control device 30 controls the actuator 16 to drive the wide-angle camera 12 and/or the telephoto camera 14, so that the telephoto camera 14 can image the user-designated area, that is, the overlapped portion 13 is moved to the user-designated area, and the imaging device 10 can perform an image combining on the overlapped portion 13 to improve the sharpness of the designated area.

Figure 7:
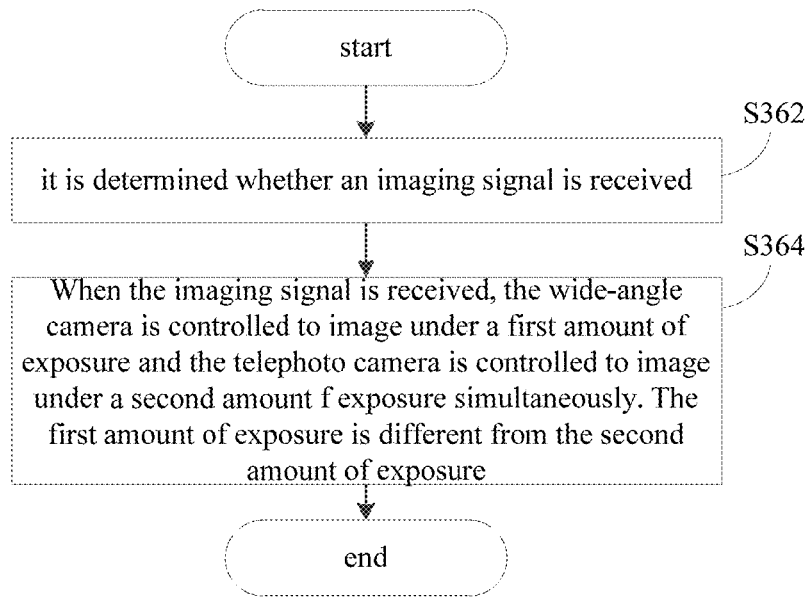
FIG. 7 is a flow chart of a control method in at least one embodiment of the present disclosure.

FIG. 7 illustrates a control method in at least one embodiment of the present disclosure. As shown in FIG. 7, block S36 includes following acts.

At block S362, it is determined whether an imaging signal is received.

At block S364, when the imaging signal is received, the wide-angle camera is controlled to image under a first amount of exposure and the telephoto camera is controlled to image under a second amount of exposure simultaneously. The first amount of exposure is different from the second amount of exposure.

Figure 8:
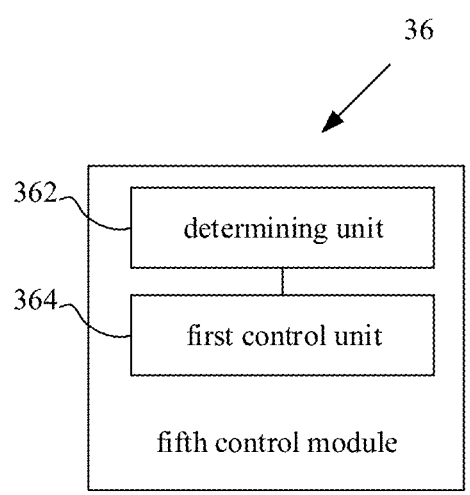
FIG. 8 is a schematic diagram illustrating functional modules of a fifth control module in at least one embodiment of the present disclosure.

FIG. 8 illustrates functional modules of an electronic device in at least one embodiment of the present disclosure. As shown in FIG. 8, the fifth control module 36 includes a determining unit 362 and a first control unit 364. The determining unit 362 is configured to determine whether an imaging signal is received. The first control unit 364 is configured to control the wide-angle camera 12 to image under a first amount of exposure and control the telephoto camera 14 to image under a second amount of exposure simultaneously when the imaging signal is received, in which the first amount of exposure is different from the second amount of exposure.

That is, block S362 may be realized by the determining unit 362, and block S364 may be realized by the first control unit 364.

In at least one embodiment, whether the imaging signal is received may be determined by determining whether a photographing key is pressed or whether the user controls the imaging device 10 through the input device 24, which is not limited herein.

In at least one embodiment, the wide-angle camera 12 and the telephoto camera 14 may work simultaneously. The overlapped portions of the wide-angle image and the telephoto image obtained at different times may be different, for example, a moving object appears or disappears. Thus, ghosting, image blurring and the like may occur after image combining. By making the wide-angle camera 12 and the telephoto camera 14 work simultaneously, the overlapped portions of the wide-angle image and the telephoto image obtained at different times may be basically the same, thereby avoiding a problem of quality deterioration after image combining.

In at least one embodiment, the first amount of exposure may be a long exposure, and the second amount of exposure may be a short exposure. By combining the long exposure image and the short exposure image, a high dynamic range image may be acquired and sharpness of the image may be improved.

In at least one embodiment, block S37 may include followings. First, the overlapped portion of the wide-angle image and the overlapped portion of the telephoto image are extracted respectively. Then, pixel values in the overlapped portions of the wide-angle image and the telephoto image are calculated respectively using weighting values. The weighting values may be determined by a related module in the imaging apparatus 10 or may be set according to the user's beauty-appreciation and needs. Finally, the weighted pixel values of the wide-angle image and of the telephoto image may be added to acquire a high dynamic range image, thereby improving sharpness of the image.

In at least one embodiment, block S37 may include followings. First, the overlapped portion of the wide-angle image and the overlapped portion of the telephoto image are extracted respectively. Then, pixels with a pixel value larger than a pixel threshold are extracted from the overlapped portion of the telephoto image. The pixel threshold value may be determined by a related module in the imaging apparatus 10 or may be set according to the user's beauty-appreciation and needs. Finally, corresponding pixels in the wide-angle image are replaced by the pixels extracted from the telephoto image, thereby acquiring a high dynamic range image and improving sharpness of the image.

Figure 9:
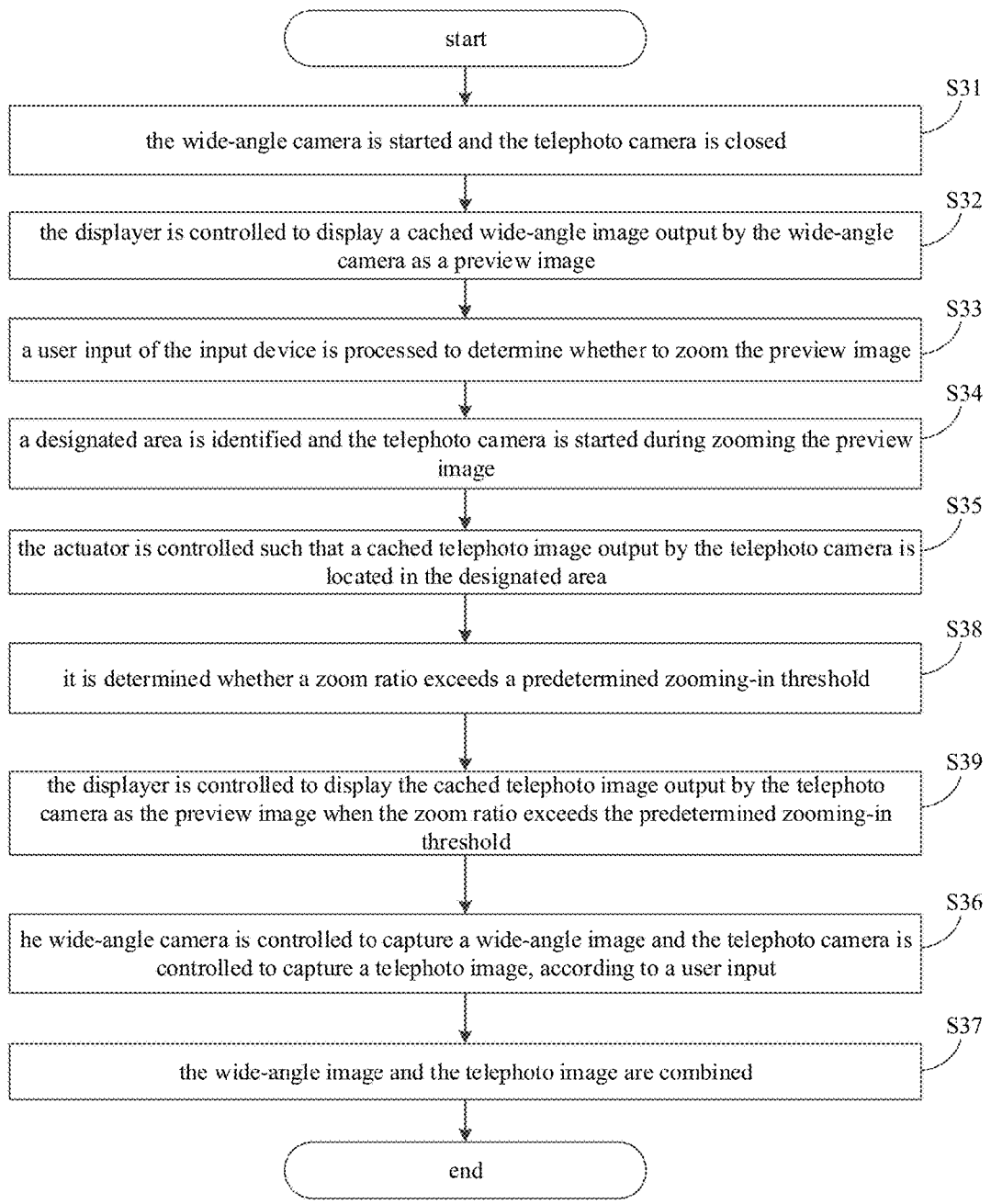
FIG. 9 is a flow chart of a control method in at least one embodiment of the present disclosure.

FIG. 9 illustrates a control method in at least one embodiment of the present disclosure. As shown in FIG. 9, the control method further includes following acts.

At block S38, it is determined whether a zoom ratio exceeds a predetermined zooming-in threshold.

At block S39, the displayer is controlled to display the cached telephoto image output by the telephoto camera as the preview image when the zoom ratio exceeds the predetermined zooming-in threshold.

Figure 10:
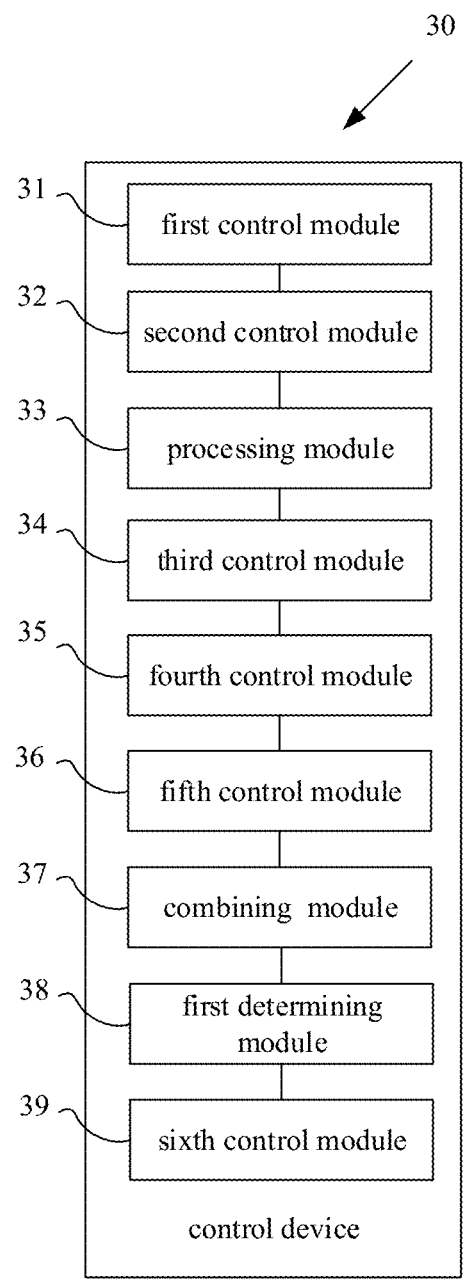
FIG. 10 is a schematic diagram illustrating functional modules of an electronic device in at least one embodiment of the present disclosure.

FIG. 10 illustrates functional modules of an electronic device in at least one embodiment of the present disclosure. As shown in FIG. 10, the control device 30 further includes a first determining module 38 and a sixth control module 39. The first determining module 38 is configured to determine whether a zoom ratio exceeds a predetermined zooming-in threshold. The sixth control module 39 is configured to control the displayer 22 to display the cached telephoto image output by the telephoto camera 14 as the preview image when the zoom ratio exceeds the predetermined zooming-in threshold.

That is, block S38 may be realized by the first determining module 38, and block S39 may be realized by the sixth control module 39.

In at least one embodiment, when the imaging device 10 is working, the wide-angle camera 12 is first used for focusing and outputting the cached wide-angle image as the preview image, since the wide-angle camera 12 has a larger angle of view and a shorter focal length and is suitable for capturing the close-range scene. When the user performs the zooming, or when the imaging device 10 performs the zooming, the cached wide-angle image is processed to realize digital zoom. When the zoom ratio exceeds the predetermined threshold, since the telephoto camera 14 has a smaller angle of view and a longer focal length and is suitable for capturing the long-range scene, the telephoto camera 14 has more advantages over the wide-angle camera 12, so that the image device 10 performs optical zoom, that is, the telephoto camera 14 is used for focusing and outputting the cached telephoto image as the preview image.

Figure 11:
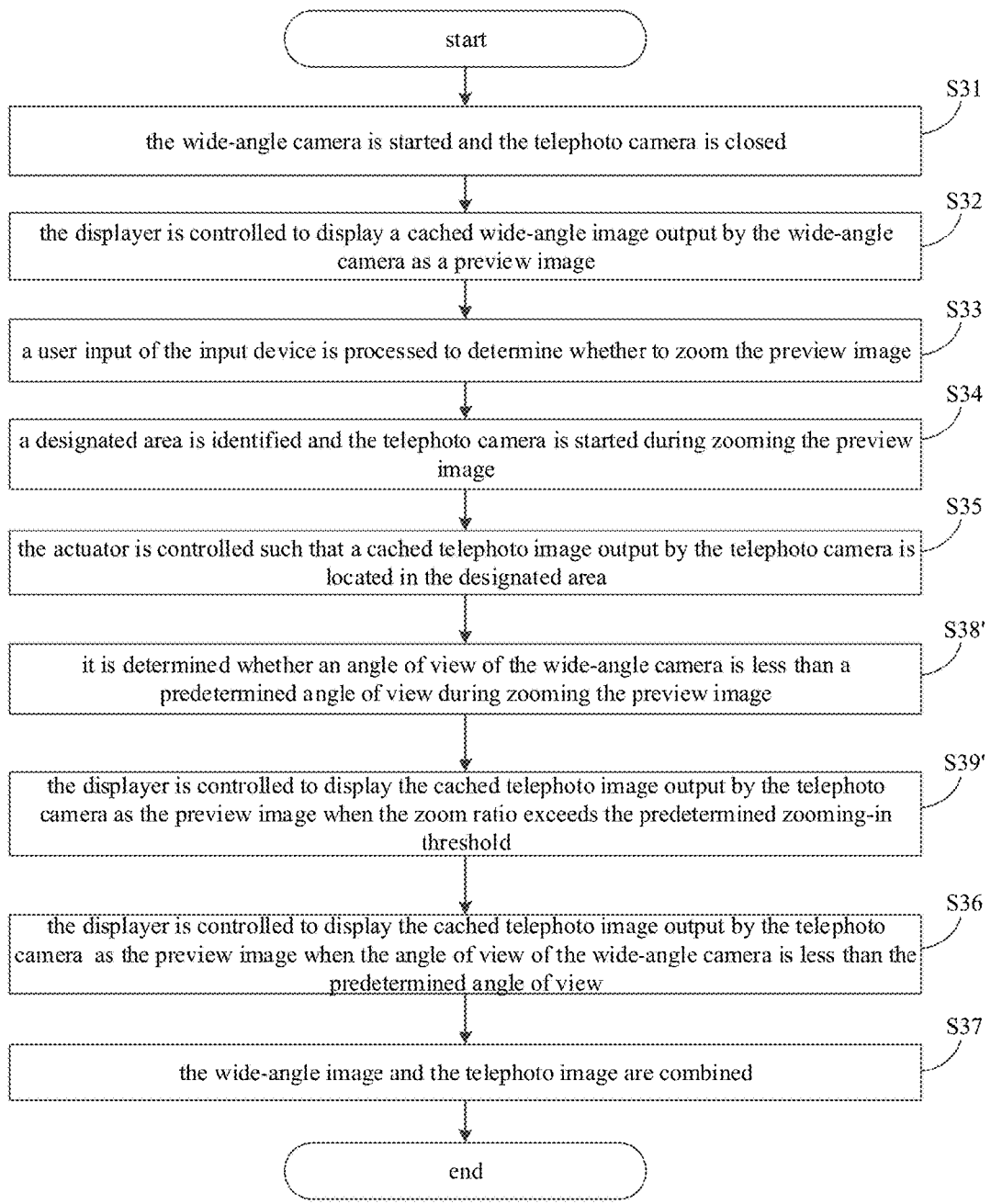
FIG. 11 is a flow chart of a control method in at least one embodiment of the present disclosure.

FIG. 11 illustrates a control method in at least one embodiment of the present disclosure. As shown in FIG. 11, the control method further includes following acts.

At block S38', it is determined whether an angle of view of the wide-angle camera 12 is less than a predetermined angle of view during zooming the preview image.

At block S39', the displayer is controlled to display the cached telephoto image output by the telephoto camera 14 as the preview image when the angle of view of the wide-angle camera 12 is less than the predetermined angle of view.

Figure 12:
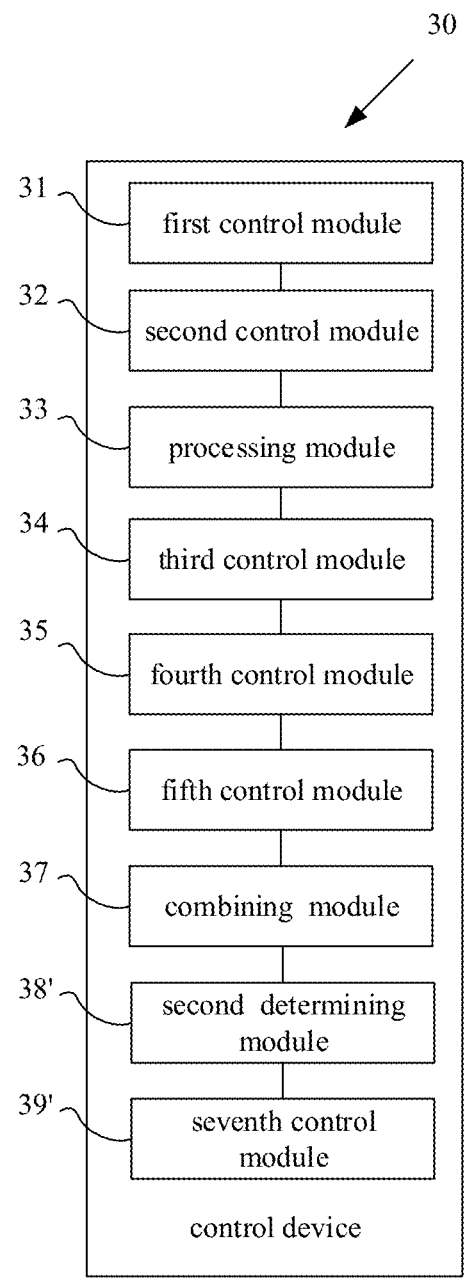
FIG. 12 is a schematic diagram illustrating functional modules of an electronic device in at least one embodiment of the present disclosure.

FIG. 12 illustrates functional modules of an electronic device in at least one embodiment of the present disclosure. As shown in FIG. 12, the control device 30 further includes a second determining module 38' and a seventh control module 39'. The second determining module 38' is configured to determine whether an angle of view of the wide-angle camera 12 is less than a predetermined angle of view during zooming the preview image. The seventh control module 39' is configured to control the displayer 22 to display the cached telephoto image output by the telephoto camera 14 as the preview image when the angle of view of the wide-angle camera 12 is less than the predetermined angle of view.

That is, block S38' may be realized by the second determining module 38', and block S39' may be realized by the seventh control module 39'.

In at least one embodiment, when the imaging device 10 is working, the wide-angle camera 12 is first used for focusing and outputting the cached wide-angle image as the preview image, since the wide-angle camera 12 has a larger angle of view and a shorter focal length and is suitable for capturing the close-range scene. When the user performs the zooming, or when the imaging device 10 performs the zooming, the cached wide-angle image is processed to realize digital zoom. When the angle of view of the wide-angle camera 12 is less than the predetermined angle of view during zooming the preview image, since the telephoto camera 14 has a smaller angle of view and a longer focal length and is suitable for capturing the long-range scene, the telephoto camera 14 has more advantages over the wide-angle camera 12, so that the image device 10 performs optical zoom, that is, the telephoto camera 14 is used for focusing and outputting the cached telephoto image as the preview image.

In at least one embodiment, the predetermined zooming-in threshold is less than or equal to a ratio of an angle of view of the wide-angle camera 12 to an angle of view of the telephoto camera 14.

In at least one embodiment, the predetermined angle of view is less than or equal to a maximum angle of view of the telephoto camera 14.

Figure 13:
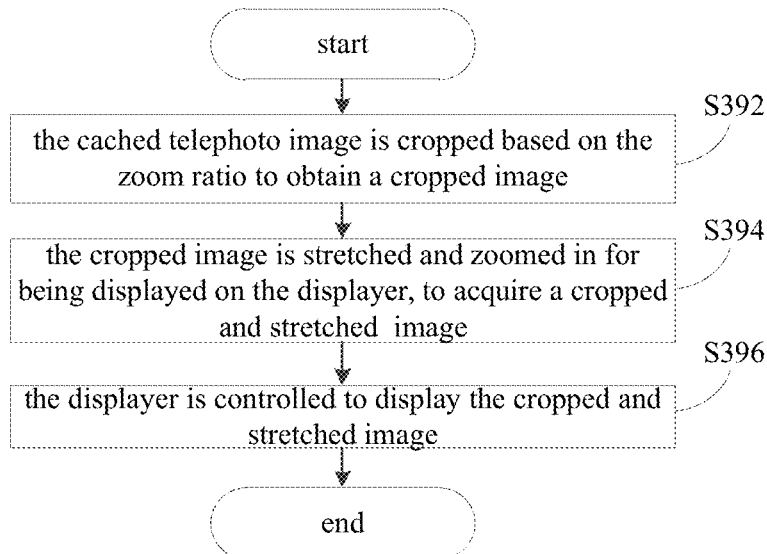
FIG. 13 is a flow chart of a control method in at least one embodiment of the present disclosure.

FIG. 13 illustrates a control method in at least one embodiment of the present disclosure. As shown in FIG. 13, Block S39 or S39' may include following acts.

At block S392, the cached telephoto image is cropped based on the zoom ratio to obtain a cropped image.

At block S394, the cropped image is stretched and zoomed in for being displayed on the displayer, to acquire a cropped and stretched image.

At block S396, the displayer is controlled to display the cropped and stretched image.

Figure 14:
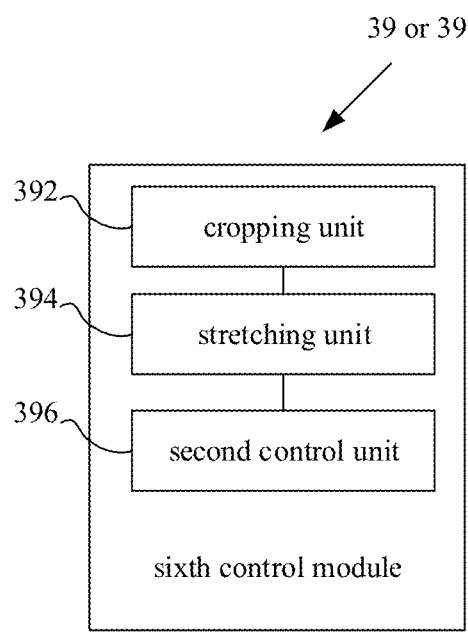
FIG. 14 is a schematic diagram illustrating functional modules of a sixth or seventh control module in at least one embodiment of the present disclosure.

FIG. 14 illustrates functional modules of a third control module or a determining module in at least one embodiment of the present disclosure. As shown in FIG. 14, the sixth control module 39 or the seventh control module 39' includes a cropping unit 392, a stretching unit 394 and a second control unit 396. The cropping unit 392 is configured to crop the cached telephoto image based on the zoom ratio to obtain a cropped image. The stretching unit 394 is configured to stretch and zoom in the cropped image for being displayed on the displayer 22, to acquire a cropped and stretched image. The second control unit 396 is configured to control the displayer 22 to display the cropped and stretched image.

That is, block S392 may be realized by the cropping unit 392, block S394 may be realized by the stretching unit 394, and block S396 may be realized by the second control unit 396.

In at least one embodiment, when the telephoto camera 14 is working, the zooming in performed by the imaging device 10 belongs to digital zoom. The image after digital zoom may be obtained by image processing for the cached telephoto image, and the control device 30 may control the displayer 24 to display the image after the digital zoom as the preview image.

In the description of the present disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", and "anti-clockwise", refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which should not limit the present disclosure.

In addition, terms such as "first" and "second" are used herein for purposes of description and are not intended to indicate or imply relative importance or significance, or imply the number of defined features. Thus, the feature defined with "first" and "second" may comprise one or more this feature. In the description of the present disclosure, "a plurality of" means two or more than two, unless specified otherwise.

In the description of the present disclosure, it should be understood that, unless specified or limited otherwise, the terms "mounted," "connected," and "coupled" and variations thereof are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the present disclosure.

In the present disclosure, unless specified or limited otherwise, the first feature is "on" or "under" the second feature refers to the first feature and the second feature can be direct or via media indirect mountings, connections, and couplings. And, the first feature is "on", "above", "over" the second feature may refer to the first feature is right over the second feature or is diagonal above the second feature, or just refer to the horizontal height of the first feature is higher than the horizontal height of the second feature. The first feature is "below" or "under" the second feature may refer to the first feature is right over the second feature or is diagonal under the second feature, or just refer to the horizontal height of the first feature is lower than the horizontal height of the second feature.

Various embodiments and examples are provided in the above description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment," "some embodiments," "an illustrative embodiment", "an example," "a specific example," or "some examples," means that a particular feature, structure, material, or characteristic described in connection with the embodiment or example is included in at least one embodiment or example of the present disclosure. Thus, the indicative expressions of the above phrases are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

It should be noted that, although the present disclosure has been described with reference to the embodiments, it will be appreciated by those skilled in the art that the disclosure includes other examples that occur to those skilled in the art to execute the disclosure. Therefore, the present disclosure is not limited to the embodiments.

What is claimed is:

1. A control method, configured for controlling an electronic device, wherein the electronic device comprises an imaging device, a displayer and an input device, the imaging device comprises a wide-angle camera, a telephoto camera and an actuator, a field of view of the wide-angle camera has an overlapped portion with a field of view of the telephoto camera, the actuator is configured to actuate relative movement of the wide-angle camera and/or the telephoto camera for changing a relative location of the overlapped portion in the field of view of the wide-angle camera, and the control method comprises:

starting the wide-angle camera and closing the telephoto camera;

controlling the displayer to display a cached wide-angle image output by the wide-angle camera as a preview image;

processing a user input inputted via the input device to determine whether to zoom the preview image displayed on the displayer;

upon zooming the preview image displayed on the displayer, acquiring an initial location based on the user input;

extending outward from the initial location to acquire a designated area having a same size with a cached telephoto image output by the telephoto camera the size of the cached telephoto image being determined in advance;

starting the telephoto camera;

controlling the actuator such that a cached telephoto image output by the telephoto camera is overlapped with the designated area of the preview image;

controlling the wide-angle camera to capture a wide-angle image and controlling the telephoto camera to capture a telephoto image, according to the user input; and combining the wide-angle image and the telephoto image of an overlapped portion between the wide-angle image and the telephoto image.

2. The control method according to claim 1, wherein controlling the wide-angle camera to capture the wide-angle image and controlling the telephoto camera to capture the telephoto image according to the user input comprises:

determining whether an imaging signal is received;

when the imaging signal is received, controlling the wide-angle camera to image under a first amount of exposure and controlling the telephoto camera to image under a second amount of exposure simultaneously, the first amount of exposure being different from the second amount of exposure.

3. The control method according to claim 1, further comprising:

determining whether a zoom ratio exceeds a predetermined zooming-in threshold during zooming the preview image; and controlling the displayer to display the cached telephoto image output by the telephoto camera as the preview image when the zoom ratio exceeds the predetermined zooming-in threshold.

4. The control method according to claim 3, wherein the predetermined zooming-in threshold is less than or equal to a ratio of an angle of view of the wide-angle camera to an angle of view of the telephoto camera.

5. The control method according to claim 1, further comprising:

determining whether an angle of view of the wide-angle camera is less than a predetermined angle of view during zooming the preview image; and controlling the displayer to display the cached telephoto image output by the telephoto camera as the preview image when the angle of view of the wide-angle camera is less than the predetermined angle of view.

6. The control method according to claim 5, wherein the predetermined angle of view is less than or equal to a maximum angle of view of the telephoto camera.

7. The control method according to claim 3, wherein controlling the displayer to display the cached telephoto image output by the telephoto camera as the preview image comprises:

cropping the cached telephoto image according to the zoom ratio, to obtain a cropped image;

stretching and zooming in the cropped image for being displayed on the displayer, to acquire a cropped and stretched image; and controlling the displayer to display the cropped and stretched image.

8. A control device, configured for controlling an electronic device, wherein the electronic device comprises an imaging device, a displayer and an input device, the imaging device comprises a wide-angle camera, a telephoto camera and an actuator, a field of view of the wide-angle camera has an overlapped portion with a field of view of the telephoto camera, the actuator is configured to actuate relative movement of the wide-angle camera and/or the telephoto camera for changing a relative location of the overlapped portion in the field of view of the wide-angle camera, and the control device comprises a non-transitory computer-readable medium comprising computer-executable instructions stored thereon; and an instruction execution system, which is configured by the instructions to implement at least one of:

a first control module, configured to start the wide-angle camera and to close the telephoto camera;

a second control module, configured to control the displayer to display a cached wide-angle image output by the wide-angle camera as a preview image;

a processing module, configured to process a user input inputted via the input device to determine whether to zoom the preview image displayed on the displayer;

a processing unit, configured to acquire an initial location based on the user input upon zooming the preview image displayed on the displayer;

an extending unit, configured to extend outward from the initial location to acquire a designated area having a same size with a cache telephoto image outputted by the telephoto camera, the size of the cached telephoto image being determined in advance;

a starting unit, configured to start the telephoto camera;

a fourth control module, configured to control the actuator such that a cached telephoto image output by the telephoto camera is overlapped with the designated area of the preview image;

a fifth control module, configured to control the wide-angle camera to capture a wide-angle image and control the telephoto camera to capture a telephoto image, according to the user input; and a combining module, configured to combine the wide-angle image and the telephoto image of a overlapped portion between the wide-angle image and the telephoto image.

9. The control device according to claim 8, wherein the fifth control module comprises:

a determining unit, configured to determine whether an imaging signal is received;

a first control unit, configured to control the wide-angle camera to image under a first amount of exposure and control the telephoto camera to image under a second amount of exposure simultaneously when the imaging signal is received, the first amount of exposure being different from the second amount of exposure.

10. The control device according to claim 8, wherein the instruction execution system is further configured by the instructions to implement at least one of:

a first determining module, configured to determine whether a zoom ratio exceeds a predetermined zooming-in threshold during zooming the preview image; and a sixth control module, configured to control the displayer to display the cached telephoto image output by the telephoto camera as the preview image when the zoom ratio exceeds the predetermined zooming-in threshold.

11. The control device according to claim 10, wherein the predetermined zooming-in threshold is less than or equal to a ratio of an angle of view of the wide-angle camera to an angle of view of the telephoto camera.

12. The control device according to claim 8, wherein the instruction execution system is further configured by the instructions to implement at least one of:

- a second determining module, configured to determine whether an angle of view of the wide-angle camera is less than a predetermined angle of view during zooming the preview image; and
- a seventh control module, configured to control the displayer to display the cached telephoto image output by the telephoto camera as the preview image when the angle of view of the wide-angle camera is less than the predetermined angle of view.

13. The control device according to claim 12, wherein the predetermined angle of view is less than or equal to a maximum angle of view of the telephoto camera.

14. The control device according to claim 10, wherein the sixth control module comprises:

- a cropping unit, configured to crop the cached telephoto image according to the zoom ratio, to obtain a cropped image;
- a stretching unit, configured to stretch and zoom in the cropped image for being displayed on the displayer, to acquire a cropped and stretched image; and
- a second control unit, configured to control the displayer to display the cropped and stretched image.

15. An electronic device, comprising:
an imaging device;
a displayer;
an input device; and
a control device,
wherein the control device comprises a non-transitory computer-readable medium comprising computer-executable instructions stored thereon; and an instruction execution system, which is configured by the instructions to implement at least one of:

- a first control module, configured to start the wide-angle camera and to close the telephoto camera;
- a second control module, configured to control the displayer to display a cached wide-angle image output by the wide-angle camera as a preview image;
- a processing module, configured to process a user input inputted via the input device to determine whether to zoom the preview image;
- a processing unit, configured to acquire an initial location based on the user input upon zooming the preview image displayed on the displayer;
- an extending unit, configured to extend outward from the initial location to acquire a designated area having a same size with a cache telephoto image outputted by the telephoto camera, the size of the cached telephoto image being determined in advance;
- a starting unit, configured to start the telephoto camera;
- a fourth control module, configured to control the actuator such that a cached telephoto image output by the telephoto camera is overlapped with the designated area of the preview image;
- a fifth control module, configured to control the wide-angle camera to capture a wide-angle image and control the telephoto camera to capture a telephoto image, according to the user input; and
- a combining module, configured to combine the wide-angle image and the telephoto image of a overlapped portion between the wide-angle image and the telephoto image.

16. The electronic device according to claim 15, wherein an angle of view of the wide-angle camera is from 70 degree to 90 degree, and an angle of view of the telephoto camera is from 20 degree to 60 degree.

17. The electronic device according to claim 15, wherein the field of view of the telephoto camera is within the field of view of the wide-angle camera.

18. The electronic device according to claim 15, wherein the actuator comprises a microelectromechanical motor or a mechanical motor.

19. The method according to claim 1, wherein combining the wide-angle image and the telephoto image of an overlapped portion between the wide-angle image and the telephoto image comprises:

- extracting an overlapped portion of the wide-angle image and an overlapped portion of the telephoto image;
- calculating pixel values in the overlapped portion of the wide-angle image and pixel values in the overlapped portion of the telephoto image using a weighting value; and
- adding weighted pixel values of the wide-angle image and weighted pixel values of the telephoto image.

* * * * *